US010353857B2

(12) United States Patent
Ajima

(10) Patent No.: US 10,353,857 B2
(45) Date of Patent: Jul. 16, 2019

(54) PARALLEL PROCESSING APPARATUS AND METHOD FOR CONTROLLING COMMUNICATION

(71) Applicant: FUJITSU LIMITED, Kawasaki-shi, Kanagawa (JP)

(72) Inventor: Yuichiro Ajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 201 days.

(21) Appl. No.: 15/469,627

(22) Filed: Mar. 27, 2017

(65) Prior Publication Data
US 2017/0293589 A1 Oct. 12, 2017

(30) Foreign Application Priority Data
Apr. 12, 2016 (JP) ................... 2016-079707

(51) Int. Cl.
G06F 15/16 (2006.01)
G06F 15/173 (2006.01)
G06F 15/167 (2006.01)
H04L 1/18 (2006.01)
H04L 29/08 (2006.01)
H04L 12/801 (2013.01)
H04L 12/823 (2013.01)
H04L 12/861 (2013.01)
(Continued)

(52) U.S. Cl.
CPC ...... G06F 15/17331 (2013.01); G06F 15/167 (2013.01); H04L 1/1829 (2013.01); H04L 29/08 (2013.01); H04L 47/11 (2013.01); H04L 47/32 (2013.01); H04L 49/9063 (2013.01); H04L 67/1097 (2013.01); H04L 69/161 (2013.01); H04L 69/329 (2013.01); G06F 12/1081 (2013.01)

(58) Field of Classification Search
CPC ....... H04L 1/1829; H04L 29/08; H04L 47/11; H04L 47/32; H04L 49/9063; H04L 67/1097; H04L 69/161; H04L 69/329; G06F 15/17331; G06F 15/167; G06F 12/1081
See application file for complete search history.

(56) References Cited

U.S. PATENT DOCUMENTS

2002/0080811 A1* 6/2002 Wetzel ................... G01D 21/00
370/442
2002/0191599 A1* 12/2002 Parthasarathy ....... G06F 9/3004
370/389
(Continued)

FOREIGN PATENT DOCUMENTS

JP 2003-316637 11/2003

Primary Examiner — Benjamin M Thieu
(74) Attorney, Agent, or Firm — Fujitsu Patent Center

(57) ABSTRACT

A packet transmitting unit transmits, to a node via RDMA communication, a packet with a first identifier that represents a predetermined process and a second identifier that represents a destination communication interface and is a logical identifier, as a destination, being added thereto. A plurality of communication interfaces exist. A packet receiving unit receives a packet transmitted from the node via RDMA communication, selects a communication interface that is a destination of a received packet and is used in the predetermined process, based on the first identifier and the second identifier added to the received packet, and transfers the received packet to a selected communication interface.

4 Claims, 6 Drawing Sheets

(51) Int. Cl.
*H04L 29/06* (2006.01)
*G06F 12/1081* (2016.01)

(56) References Cited

U.S. PATENT DOCUMENTS

2012/0331243 A1* 12/2012 Aho .................. G06F 15/167
 711/154
2013/0185381 A1* 7/2013 Aho .................. G06F 15/177
 709/217

* cited by examiner

PARALLEL PROCESSING APPARATUS AND METHOD FOR CONTROLLING COMMUNICATION

CROSS-REFERENCE TO RELATED APPLICATION

This application is based upon and claims the benefit of priority of the prior Japanese Patent Application No. 2016-079707, filed on Apr. 12, 2016, the entire contents of which are incorporated herein by reference.

FIELD

The embodiment discussed herein is related to a parallel processing apparatus and a method for controlling communication.

BACKGROUND

In recent years, a distributed memory parallel computer that is configured in such a manner that a lot of nodes that each include a processor and a memory and independently execute an Operating System (OS) are connected by an interconnection has been mainstream in a field of High Performance Computing (HPC). In such a distributed memory parallel computer, processes are booted in respective nodes and booted processes intercommunicate to exchange data thereof and execute parallel computation. An interconnection includes a network that connects nodes and a device for connecting the nodes to the network.

For reliably transferring data between two nodes, communication is controlled according to steps that are adapted to a network that connects the nodes and a characteristic of a device. Steps that are adapted to a network that connects nodes and a characteristic of a device for connecting the nodes to the network are also referred to as a protocol.

A protocol process for a Transmission Control Protocol (TCP)/an Internet Protocol (IP) that is used in the Internet is generally executed by a protocol stack of an OS. In each process, data input to or output from a protocol stack is executed by a software interface such as Barkley Socket. A protocol process that is executed by a protocol stack is executed in a system process of an OS. That is, in a case where a protocol process is executed, a process that is executed by interruption in a processor transfers to an OS kernel, and during all that time, it is difficult for the processor to execute another computation.

For increasing operation efficiency of a processor, that is, bringing execution performance closer to theoretical performance, it is preferable for a processor to execute no protocol process. In a field of HPC, data are transferred by a method that is generally referred to as a Remote Direct Memory Access (RDMA). RDMA is a technique such that an interconnection device directly reads a memory that is managed in a transmission source process, and data are transferred through a network that connects nodes and directly written in a memory that is managed in a destination process.

In such an RDMA method, communication start control is also received to start a process similarly to another protocol process. For communication start control in RDMA, a method that controls a communication start based on a memory map register that is mapped in a memory space is general from a viewpoint of hardware. For communication start control in RDMA, an interconnection is also a kind of an input or output device, and hence, a method such that an OS gathers communication start request of respective processes and a device driver controls communication representatively is general from a viewpoint of software. A device driver is a mechanism of an OS for gathering control request from various processes to control an input or output instrument representatively.

Communication start control through a device driver is involved with a process of interrupting processing of a process and transferring to an OS kernel process. Such a process is referred to as a process switch from a viewpoint of software and referred to as a context switch from a viewpoint of hardware. A process of interrupting processing of a process and transferring to an OS kernel process is a process with a large overhead, and hence, is preferably avoided in an HPC where computation time of a processor is important. For example, a plurality of sets of control registers that are referred to as communication interfaces are prepared, and such a communication interface is allocated to a virtual memory space of each process and is exclusively utilized in such a process, so that communication start control through a device driver can be avoided. Such a communication interface corresponds to a device for connecting nodes in an interconnection to a network.

In parallel computers that are mounted with an interconnection that includes a plurality of communication interfaces, the communication interfaces are allocated to not only each process in an node but also a process of executing communication for a system such as file input or output or system control. Herein, communication for a system is communication in a process that is ordinarily operated at a time of node operation, and for example, communication for management that is executed by a program that manages a whole system, communication with a storage device, or the like.

Allocation of a communication interface to a process of executing communication for a system based on system software tends to be fixed. In such fixed allocation of a communication interface, extension of a communication resource is difficult. In a case where a communication interface is allocated fixedly, virtualization of an interconnection on software is executed when a virtual machine is introduced.

There is a conventional technique of a computer cluster that uses a correspondence relation between a global identifier that is allocated to a whole cluster system and a local identifier that is used in each computer.

Japanese Laid-open Patent Publication No. 2003-316637

However, in an interconnection that corresponds to virtualization, an OS and a device driver manage communication interfaces in order to hide the number of practical communication interfaces. In such a case, a communication interface is dynamically allocated to even a process of executing communication for a system.

For executing communication between dynamically allocated communication interfaces, exchange of identifiers of communication interfaces between nodes is preliminarily executed by using a Transmission Control Protocol (TCP)/an Internet Protocol (IP), or the like. Hence, another communication means is used substantially, and thereby, is not suitable for use for a purpose of a communication for a system. From such a reason, it is not preferable to dynamically allocate a communication interface to a process of executing communication for a system.

On the other hand, in a communication interconnection that does not correspond to virtualization, competition of communication interfaces may be caused between virtual machines at a time of introduction of the virtual machines in a case where a communication interface is fixedly used for a purpose of communication for a system. In such a case, virtualization that is executed by software is used for resolving competition, but is difficult to be used in a field of HPC because an overhead for a software process is large. Thus, in a case where a communication interface is fixedly used for a purpose of communication for a system, another process is influenced thereby, so that degradation of throughput of a parallel processing apparatus is caused.

For avoidance of competition of communication interfaces between virtual machines, a method is considered for multiplexing a virtualized input or output device. For example, an input or output device has conventionally been multiplexed by allocating a plurality of virtualized input or output device to each virtual machine. In a case where such a method is applied to an interconnection, competition of communication interfaces between virtual machines at a time of introduction of the virtual machines can be avoided. However, even though virtual input or output device is multiplexed in such a method, only one substance is provided, so that avoidance of competition of setting registers or the like is realized by hardware and mounting is complicated.

A conventional technique for a computer cluster that uses a correspondence relation between a global identifier and a local identifier is information that is used for management of a resource in a cluster and is difficult to be used for communication between nodes.

SUMMARY

According to an aspect of an embodiment, a parallel processing apparatus includes a first information processing device and a second information processing device, wherein: the first information processing device includes a transmitting unit that transmits, to the second information processing device via RDMA communication, a packet with a first identifier which represents a predetermined process and a second identifier which represents a destination communication interface and is a logical identifier, as destinations, being added thereto; and the second information processing device includes a plurality of communication interfaces and a receiving unit that receives a packet transmitted from the first information processing device via RDMA communication, selects a communication interface which is a destination of a received packet and is used in the predetermined process, based on the first identifier and the second identifier added to the received packet, and transfers the received packet to the selected communication interface.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. A parallel processing apparatus and a method for controlling communication as disclosed in the present application are not limited by the following embodiment.

Figure 1:
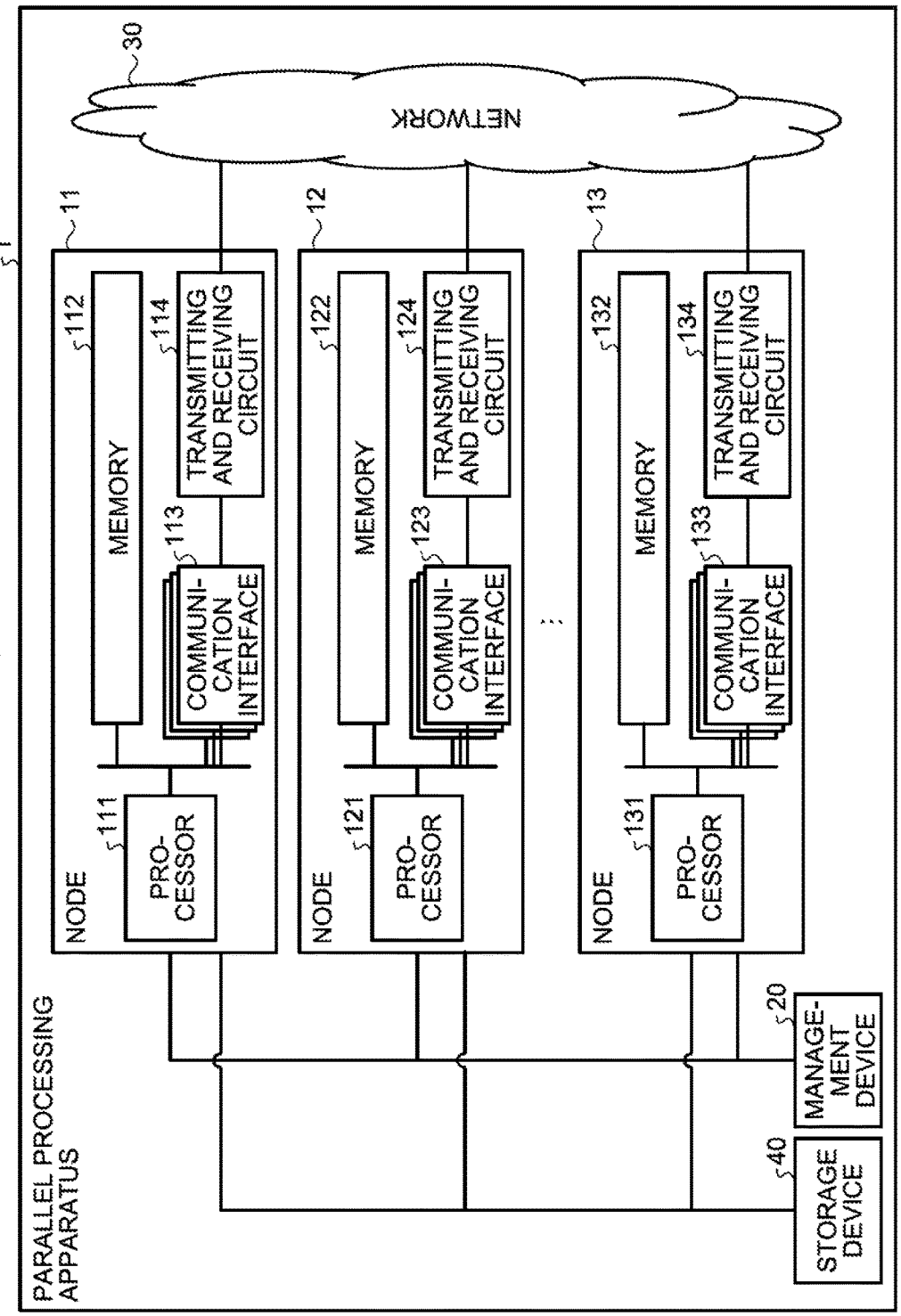
FIG. 1 is a configuration diagram of a parallel processing apparatus.

FIG. 1 is a configuration diagram of a parallel processing apparatus. As illustrated in FIG. 1, a parallel processing apparatus 1 according to the present embodiment includes a plurality of nodes that include nodes 11 to 13. In a case where respective nodes that include the nodes 11 to 13 are not distinguished from one another, "nodes 10" are referred to as. The nodes 10 are examples of a first information processing device and a second information processing device. The parallel processing apparatus 1 includes a management device 20, a network 30, and a storage device 40.

The network 30 is a network that forms an interconnection, and connects the nodes 10 to one another.

The management device 20 is connected to each of the nodes 10 by using a TCP/an IP or the like. The management device 20 executes allocation of a parallel computation task to each of the nodes 10, detection of abnormality in each of the nodes 10, or the like.

The storage device 40 is connected to each of the nodes 10 by using a TCP/an IP or the like. The storage device 40 stores a program and data that are used for parallel computation. Although the storage device 40 that stores a program and data are arranged separately from the nodes 10 in the parallel processing apparatus 1 in the present embodiment, a configuration may be provided in such a manner that a hard disk is mounted on each of the nodes 10 and a program and data are stored in such a hard disk.

The node 11 includes a processor 111, a memory 112, communication interfaces 113, and a transmitting and receiving circuit 114. The node 12 includes a processor 121, a memory 122, communication interfaces 123, and a transmitting and receiving circuit 124. The node 13 includes a processor 131, a memory 132, communication interfaces 133, and a transmitting and receiving circuit 134. Any of the nodes 11, 12, and 13 executes an identical operation, and hence, the node 11 will be described as an example.

The processor 111 is an arithmetic processing unit. The processor 111 causes an OS to operate. The processor 111 reads a program stored in the storage device 40, and deploys on the memory 112 and executes a process. The processor 111 executes a process, and thereby executes arithmetic processing by using the memory 112. The processor 111 executes communication with another node 12 or 13 by using the communication interfaces 113. The processor 111 instructs the communication interfaces 113 to execute communication based on RDMA (that will be referred to as "RDMA communication", below), so that the communication interfaces 113 are caused to execute RDMA communication.

The memory 112 is a main storage device. The memory 112 is, for example, a Random Access Memory (RAM).

The communication interfaces 113 are devices for connecting the node 11 in an interconnection to the network 30. The communication interfaces 113 include a plurality of physical communication interfaces. Herein, the number of communication interfaces that are included in each of the nodes 10, such as the communication interfaces 113, 123, or 133 is not particularly limited and the number of communication interfaces may be different among the nodes 10.

The communication interfaces 113 can execute data transmission based on RDMA. The communication interfaces 113 include an arithmetic processing device that is composed of a dedicated circuit or the like that operates independently of the processor 111. Such an arithmetic processing device realizes control of data transmission, a receiving response, or the like that uses RDMA communication through the communication interfaces 113. A physical identifier (ID) that is a physical identifier is allocated to each of the communication interfaces 113. A logical ID that will be described later is allocated to each of the communication interfaces 113. In a process that is executed by the processor 111, the communication interfaces 113 are caused to correspond to communication interfaces that are used in each process.

The communication interfaces 113 transmit a packet with a physical ID of a destination communication interface being added thereto, to the transmitting and receiving circuit 114, in a case where data are transmitted to another node 10 via RDMA communication. In a case where data are received from another node 10 via RDMA communication, the communication interfaces 113 receive a packet from the transmitting and receiving circuit 114 and transfer the packet to a corresponding process that is executed by the processor 111.

The transmitting and receiving circuit 114 relays RDMA communication that is executed by the communication interfaces 113. Specifically, the transmitting and receiving circuit 114 receives a packet transmitted through the communication interfaces 113. The transmitting and receiving circuit 114 changes a destination to a Group Identifier (GPID) and a logical ID that will be described later. The transmitting and receiving circuit 114 transmits a packet with a changed destination to another node 10 through the network 30.

The transmitting and receiving circuit 114 specifies the communication interface 113 to be used and a process that is a destination, from destination of a packet received from another node 10 through the network 30. The transmitting and receiving circuit 114 transmits a packet to a specified process through the specified communication interface 113.

Herein, a process of transmitting to or receiving from the node 12 data stored in the memory 112 in the node 11 based on RDMA in the parallel processing apparatus 1 according to the present embodiment will be described in detail.

Figure 2:
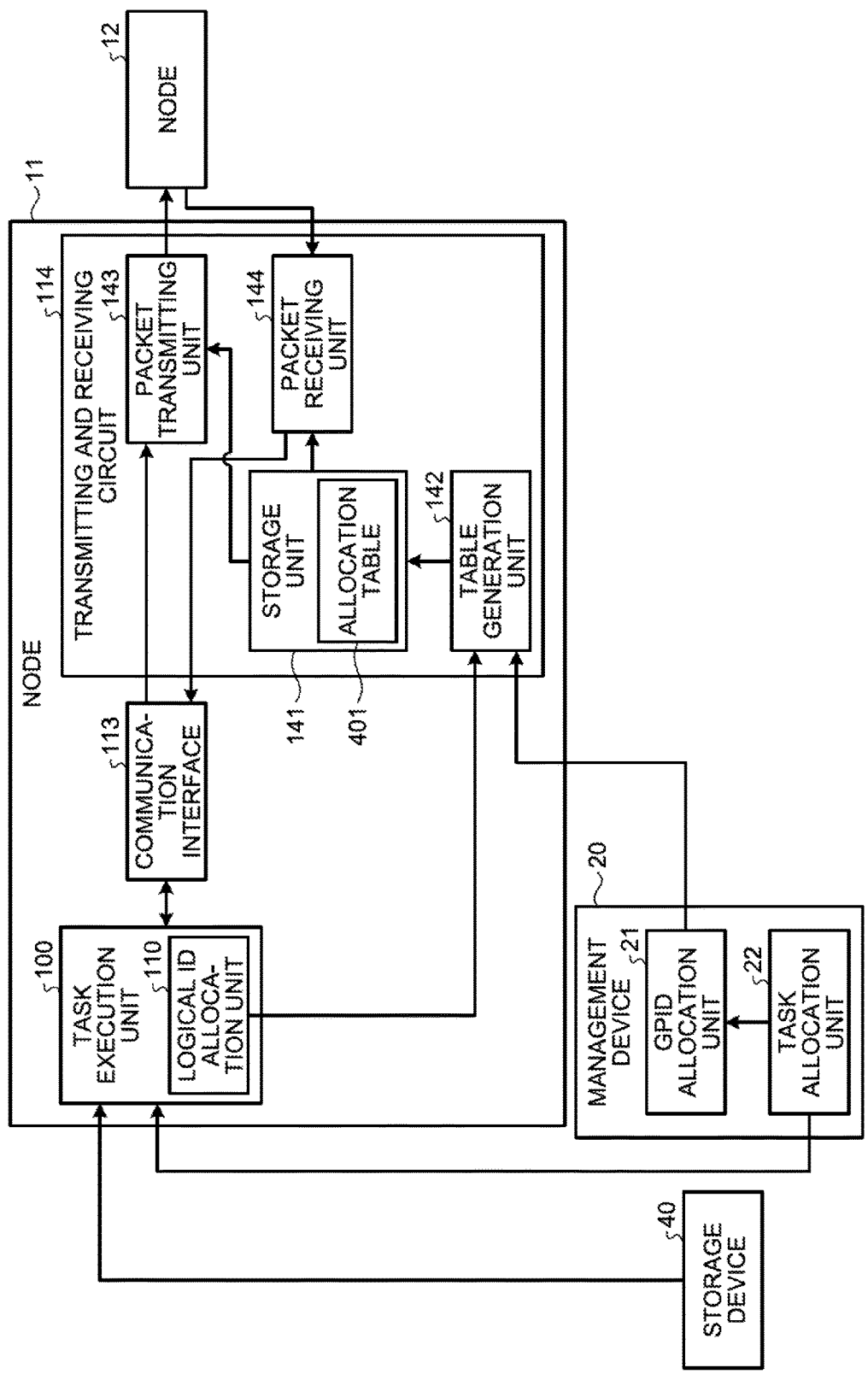
FIG. 2 is a block diagram of a node and a management device.

FIG. 2 is a block diagram of a node and a management device. Herein, a case will be described where the nodes 10 that include the node 11 are caused to execute a parallel computation task. One or more processes in the plurality of nodes 10 are executed by a task execution unit 100, so that execution of a parallel computation task is realized. That is, a parallel computation task is realized by a plurality of processes that include a process to be executed by the task execution unit 100 and are executed by each of the nodes 10. Hereinafter, a specific parallel computation task that is executed by the nodes 10 that include the node 11 is referred to as an "execution task". Each process for realizing a parallel computation task is referred to as a "process that belongs to such a parallel computation task".

The management device 20 includes a GPID allocation unit 21 and a task allocation unit 22. The task allocation unit 22 receives, from an operator, input of a parallel computation task to be executed and information on a resource such as the number of nodes that are used on such a parallel computation task. The task allocation unit 22 determines the nodes 10 that execute a specified parallel computation task, in other words, the nodes 10 with a parallel computation task being allocated thereto. Herein, the task allocation unit 22 allocates an execution task to the plurality of nodes 10 that include the node 11.

The task allocation unit 22 informs the task execution unit 100 in the node 11 of information on a program that is executed by the node 11 in order to execute an execution task. The task allocation unit 22 informs the GPID allocation unit 21 of information on the nodes 10 that include the node 11 with an execution task being allocated thereto.

The GPID allocation unit 21 allocates a GPID that is an identifier for a parallel computation task to each parallel computation task that is executed by the parallel processing apparatus 1. Specifically, the GPID allocation unit 21 allocates a unique GPID to each parallel computation task by incrementing a number or the like, every time allocation of a parallel computation task to the nodes 10 is informed of from the task allocation unit 22. For example, the GPID allocation unit 21 acquires, from the task allocation unit 22, information on the nodes 10 that include the node 11 with an execution task being allocated thereto. The GPID allocation unit 21 allocates a unique GPID to an execution task. Such a GPID corresponds to an example of a "first identifier" and a "global identifier".

The GPID allocation unit 21 informs each of the nodes 10 with a parallel computation task being allocated thereto of a GPID that corresponds to such an allocated parallel computation task. For example, the GPID allocation unit 21 informs a table generation unit 142 in the transmitting and receiving circuit 114 in the node 11 of a GPID that corresponds to an execution task. The GPID allocation unit 21 corresponds to an example of a "first allocation unit".

Although allocation of a GPID to a parallel computation task has been described as an example in the present embodiment, a target for allocation of a GPID is not limited thereto and the GPID allocation unit 21 allocates a GPID to, for example, each process that is executed by the parallel processing apparatus 1 and executes specific communication. Each process that executes specific communication is, for example, each process that executes communication determined in a parallel computation processing device, such as a process that executes communication with storage or communication for management that is executed by a program that manages a whole system. A virtual machine that executes a process that executes specific communication that includes such a parallel computation task and the parallel computation task corresponds to an example of a "predetermined process". Herein, a virtual machine is software or a framework that emulates an operation of a computer and is considered as an example of a process.

The node 11 includes the task execution unit 100, the communication interface 113, and the transmitting and receiving circuit 114. Although FIG. 2 illustrates one communication interface 113, the communication interface 113, in practice, includes a plurality of communication interfaces as illustrated in FIG. 1. Hereinafter, the communication interface 113 is any one of a plurality of communication interfaces mounted on the node 11.

The task execution unit 100 is realized by the processor 111 and the memory 122 in FIG. 2. The task execution unit 100 includes a logical ID allocation unit 110.

The task execution unit 100 acquires, from the task allocation unit 22, information on a program that is executed in the node 11 for executing an execution task. The task execution unit 100 acquires a specified program from the storage device 40. The task execution unit 100 executes an acquired program to generate a process.

After process generation, the task execution unit 100 synchronizes with all of a process that belongs to an execution task that is executed thereby and a process that belongs to an execution task that is generated in another node 10 with the execution task being allocated thereto. The task execution unit 100 executes communication for such synchronization, with another node 10 through, for example, the appropriate communication interface 113 and the transmitting and receiving circuit 114.

The task execution unit 100 executes a program, so that the logical ID allocation unit 110 in the task execution unit 100 acquires the number of communication interfaces 113 that are used in a process that is generated from such a program. The logical ID allocation unit 110 determines the communication interface 113 that is used in a process, so as to be adapted to an acquired number. The logical ID allocation unit 110 allocates a unique logical ID to each of the communication interfaces 113 that are used in a process, throughout the nodes 10 that execute an execution task.

For example, as long as different processes are processes that are included in an identical parallel computation task, the logical ID allocation unit 110 allocates a logical ID to the communication interface 113 that is used in each process so as not to overlap. On the other hand, in a case where processes are included in different parallel computation tasks, the logical ID allocation unit 110 allocates a logical ID to the communication interface 113 while overlap between respective processes is allowed. Such a logical ID corresponds to an example of a "second identifier".

The logical ID allocation unit 110 informs the table generation unit 142 of information on an execution task and a correspondence relation between a logical ID allocated to the communication interface 113 that is used in a process for such an execution task and a physical ID of the communication interface 113. The logical ID allocation unit 110 corresponds to an example of a "second allocation unit".

After allocation of a logical ID that is executed by the logical ID allocation unit 110, the task execution unit 100 synchronizes with all of a process that belongs to an execution task that is executed thereby and a process that belongs to an execution task that is generated in another node 10 with the execution task being allocated thereto.

The task execution unit 100 executes a generated process to cooperate with a process that is executed by another node 10, and thereby, executes an execution task. By execution of such a process, the task execution unit 100 determines execution of RDMA communication with another node 10 to execute RDMA communication with the communication interface 113 for a process that is executed by another node 10 that corresponds to a process that executes RDMA communication. For example, RDMA communication between the node 11 and the node 12 will be described. In such a case, the task execution unit 100 instructs the communication interface 113 that is used for communication with the node 12 in a process that executes RDMA communication, to transmit or receive data via RDMA communication with the node 12. The task execution unit 100 corresponds to an example of a "first execution unit" and a "second execution unit".

The communication interface 113 receives information on RDMA communication from the task execution unit 100. The communication interface 113 preliminarily has information on a logical ID of the communication interface 123 in the node 12 that executes RDMA communication. The communication interface 113 receives, for example, request of Put or Get for the node 12 via RDMA communication. In a case where request of Put is received, the communication interface 113 transmits a packet with data having been stored by using a logical ID to the communication interface 123 in the node 12. In a case where request of Get is received, the communication interface 113 transmits a packet for request of data transmission to the communication interface 123 in the node 12 by using a logical ID. The communication interface 113 receives a packet with stored data from the communication interface 123 in the node 12 through the transmitting and receiving circuit 114. The communication interface 113 stores data stored in a received packet in an area of the memory 112 specified by the packet.

The communication interface 113 executes a process as described below, in a case where a packet to be transmitted is generated. The communication interface 113 stores a GPID of an execution task that belongs to a corresponding process and a logical ID of the communication interface 123 in the node 12 that is a predetermined communication destination for RDMA communication, as a destination of a packet, in a header of a packet. The communication interface 113 stores a physical ID thereof, as a transmission source of a packet, in a header of a packet. The communication interface 113 outputs a generated packet to a packet transmitting unit 143 in the transmitting and receiving circuit 114.

In a case where a packet is received, the communication interface 113 receives a packet transmitted from the communication interface 123 in the node 12 that is a predetermined communication destination for RDMA communication, from a packet receiving unit 144 in the transmitting and receiving circuit 114 as described later.

The transmitting and receiving circuit 114 includes a storage unit 141, the table generation unit 142, the packet transmitting unit 143, and the packet receiving unit 144. The storage unit 141, the table generation unit 142, the packet transmitting unit 143, and the packet receiving unit 144 are realized by, for example, a dedicated circuit that composes the transmitting and receiving circuit 114.

The storage unit 141 is a data holding circuit that holds data. Although the storage unit 141 will be described as holding an allocation table 401 below, the storage unit 141, in practice, stores a correspondence relation between information.

The table generation unit 142 receives, from the GPID allocation unit 21, a GPID allocated to an execution task that is executed by the task execution unit 100. The table generation unit 142 acquires, from the logical ID allocation unit 110, information on an execution task and a correspondence relation between a logical ID allocated to the communication interface 113 that is used in a process of such an execution task and a physical ID of the communication interface 113.

Figure 3:
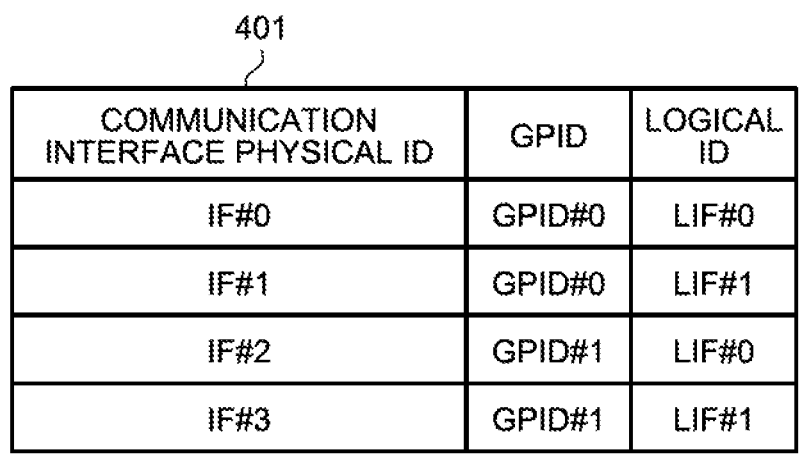
FIG. 3 is a diagram that represents an example of an allocation table.

The table generation unit 142 acquires a GPID allocated to an execution task with a process that uses each communication interface 113 belonging thereto. The table generation unit 142 creates the allocation table 401 as illustrated in FIG. 3 that represents a correspondence among a physical address of each communication interface 113, an acquired GPID, and a logical ID allocated to the communication interface 113. FIG. 3 is a diagram that represents an example of an allocation table. The table generation unit 142 stores the generated allocation table 401 in the storage unit 141.

As illustrated in FIG. 3, a GPID and a logical ID are registered in the allocation table 401 so as to correspond to a physical ID of the communication interface 113. In the allocation table 401, a physical ID of the communication interface 113 in the node 11 uniquely corresponds to a set of a GPID and a logical ID. Therefore, a physical ID of the communication interface 113 can be specified from a set of a GPID and a logical ID by using the allocation table 401.

The packet transmitting unit 143 receives input of a packet from the communication interface 113 at a time of packet transmission via RDMA communication. The packet transmitting unit 143 transmits a packet to another node 10 such as the node 12 via RDMA communication. The packet transmitting unit 143 corresponds to an example of a "transmitting unit".

The packet receiving unit 144 receives a packet from another node 10 such as the node 12 via RDMA communication. The packet receiving unit 144 acquires a set of a GPID and a logical ID that are stored in a header of a received packet and represent a destination of the packet. The packet receiving unit 144 acquires, from the allocation table 401, a physical ID of the communication interface 113 that corresponds to a set of a GPID and a logical ID in the node 11. The packet receiving unit 144 selects the communication interface 113 that has an acquired physical ID. The packet receiving unit 144 transmits a received packet to the selected communication interface 113. The packet receiving unit 144 corresponds to an example of a "receiving unit".

Thus, the packet receiving unit 144 can transmit a packet to the communication interface 113 that is used in a process of a destination of such a packet, by using a logical ID allocated to the communication interface 113 and a GPID of an execution task. That is, each node 10 can reliably execute RDMA communication by using a logical ID dynamically allocated to the communication interface 113.

Figure 4:
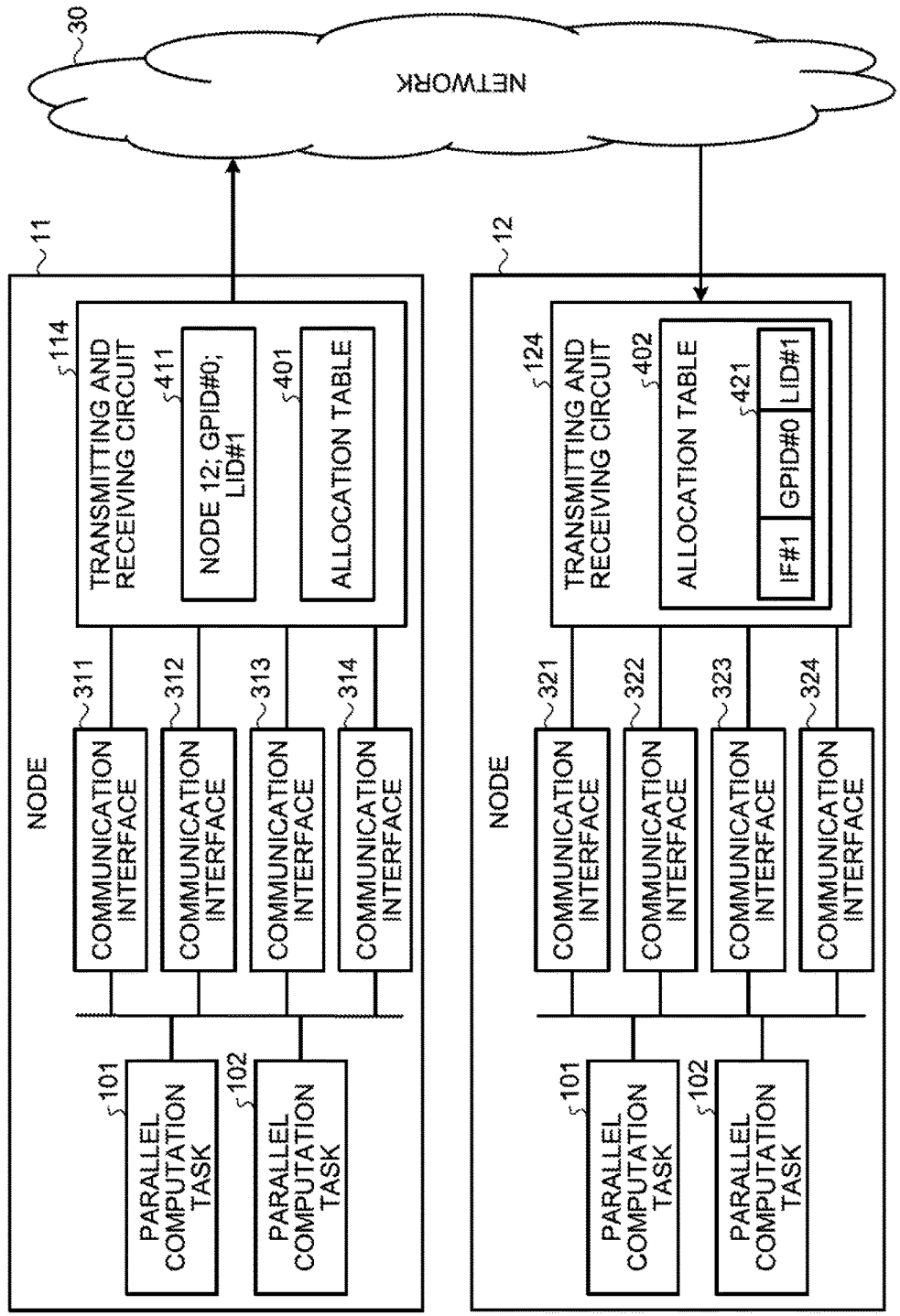
FIG. 4 is a diagram for illustrating RDMA communication between nodes that uses a GPID and a logical ID.

Next, RDMA communication between the node 11 and the node 12 will collectively be described with reference to FIG. 4. FIG. 4 is a diagram for illustrating RDMA communication between nodes that uses a GPID and a logical ID. In FIG. 4, software and hardware are illustrated in combination for convenience of illustration.

In the nodes 11 and 12, parallel computation tasks 101 and 102 are executed. A case will be described where communication interfaces 311 to 314 are mounted as the communication interfaces 113 in the node 11 and communication interfaces 321 to 324 are mounted as the communication interfaces 113 in the node 12.

The communication interfaces 311 to 314 in the node 11 have IF #0 to #3 as physical IDS, respectively. The communication interfaces 311 to 313 are allocated as the communication interfaces 113 that are used in the parallel computation task 101. GPID #0 is allocated to the parallel computation task 101. LIF #0 to #2 as logical IDS are allocated to the communication interfaces 311 to 313. The communication interface 314 is allocated as the communication interface 113 that is used in the parallel computation task 102. GPID #1 is allocated to the parallel computation task 102. LIF #0 to #2 as logical IDS are allocated to the communication interface 314.

The communication interfaces 321 to 324 in the node 12 have IF #0 to #4 as physical IDS, respectively. Physical IDS of the communication interfaces 113 may overlap between the nodes 10. The communication interfaces 321 and 322 are allocated as the communication interfaces 113 that are used in the parallel computation task 101. LIF #0 and #1 as logical IDS are allocated to the communication interfaces 321 and 322, respectively. The communication interfaces 323 and 324 are allocated as the communication interfaces 113 that are used in the parallel computation task 102. LIF #0 and #1 as logical IDS are allocated to the communication interfaces 323 and 324, respectively.

The transmitting and receiving circuit 114 in the node 11 stores the allocation table 401. The transmitting and receiving circuit 124 in the node 12 stores an allocation table 402. A GPID and a logical ID are registered in the allocation tables 401 and 402 so as to correspond to IF #0 to 4 that are physical IDS of the communication interfaces 311 to 314 mounted on the node 11. A GPID and a logical ID are registered in the allocation tables 401 and 402 so as to correspond to IF #0 to 4 that are physical IDS of the communication interfaces 321 to 324 mounted on the node 12. For example, tables for the node 12 in the allocation tables 401 and 402 are similar to the allocation table 401 as illustrated in FIG. 3.

A case will be described where the parallel computation task 101 in the node 11 executes RDMA communication with the parallel computation task 101 in the node 12. The parallel computation task 101 instructs the communication interface 312 to start RDMA communication. The communication interface 312 is preliminarily determined to execute communication with the communication interface 113 with a logical ID of the node 12 having LID #1. The communication interface 312 stores identification information on the node 12, GPID #0 that is a GPID of the parallel computation task 101, and LID #1 as a logical ID, as destinations, in a header of a packet. FIG. 3 illustrates, as a destination 411, a destination stored in a header by the communication interface 312. The communication interface 312 transmits a generated packet to the transmitting and receiving circuit 114. The transmitting and receiving circuit 114 transmits a packet with a destination that is the node 12, GPID #0 and LIF #1 indicated in the destination 411 to the node 12 through the network 30.

The transmitting and receiving circuit 124 receives a packet with a destination that is the node 12, GPID #0 and LIF #1 indicated in the destination 411. The transmitting and receiving circuit 124 acquires GPID #0 and LIF #1 from a header of a received packet. The transmitting and receiving circuit 124 acquires IF #1 that is a physical ID that corresponds to GPID #0 and LIF #1 from a correspondence relation represented by a column 421 in the allocation table 402. The transmitting and receiving circuit 124 transmits a packet to the communication interface 322 with a physical ID having IF #1. Thereby, the parallel computation task 101 in the node 11 can execute communication with the parallel computation task 101 in the node 12.

Figure 5:
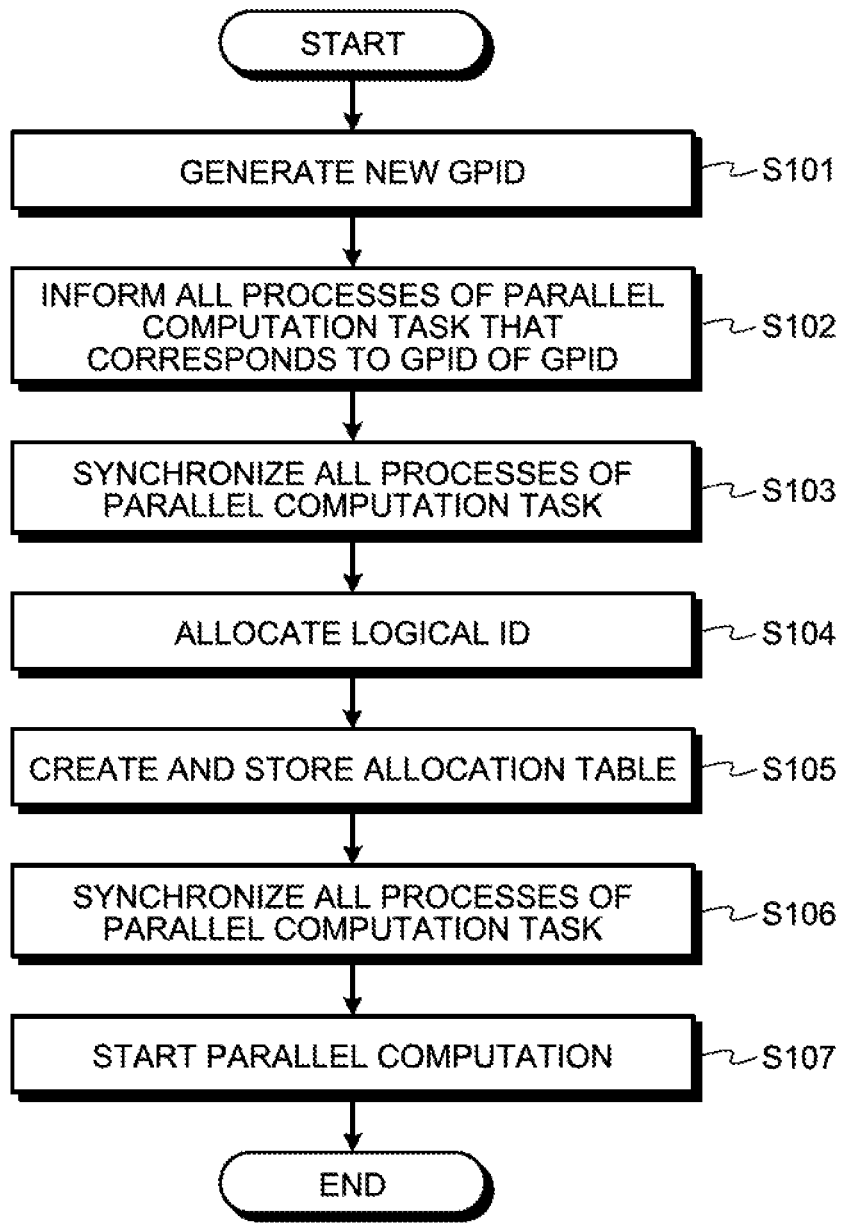
FIG. 5 is a flowchart of a process of allocating a GPID and a logical ID.

Next, a flow of a process of allocating a GPID and a logical ID will be described with reference to FIG. 5. FIG. 5 is a flowchart of a process of allocating a GPID and a logical ID.

The task allocation unit 22 in the management device 20 determines the node 10 with a parallel computation task being allocated thereto. The GPID allocation unit 21 generates a new GPID that is allocated to a parallel computation task with allocation having been executed by the task allocation unit 22 (step S101). The task allocation unit 22 informs the node 10 with a parallel computation task allocated thereto of allocation of the parallel computation task. The task execution unit 100 in the node 10 informed of allocation of a parallel computation task generates a process of the parallel computation task.

Then, the task allocation unit 22 transmits a generated GPID to the task execution unit 100 that executes each process of a parallel computation task that corresponds to the GPID, and thereby, informs all processes of the parallel computation task of the GPID (step S102).

The task execution unit 100 executes synchronization between all processes of a parallel computation task to be executed and all processes of another node 10 that executes such a parallel computation task (step S103).

The logical ID allocation unit 110 allocates a logical ID to the communication interface 113 that is used in each process (step S104). Herein, the task execution unit 100 allocates a logical ID while overlap is allowed between processes of different parallel computation tasks.

Then, the logical ID allocation unit 110 transmits a physical ID of the communication interface 113 that is used in each process of a parallel computation task, a GPID of each parallel computation task, and a logical ID of each communication interface 113 to the table generation unit 142 in the transmitting and receiving circuit 114. The table generation unit 142 creates the allocation table 401 from a received physical ID, GPID, and logical ID. The table generation unit 142 stores the generated allocation table 401 in the storage unit 141 (step S105).

Subsequently, the task execution unit 100 executes synchronization between all processes of a parallel computation task to be executed and all processes of another node 10 that executes such a parallel computation task (step S106).

The task execution unit 100 executes a process and starts parallel computation (step S107).

Figure 6:
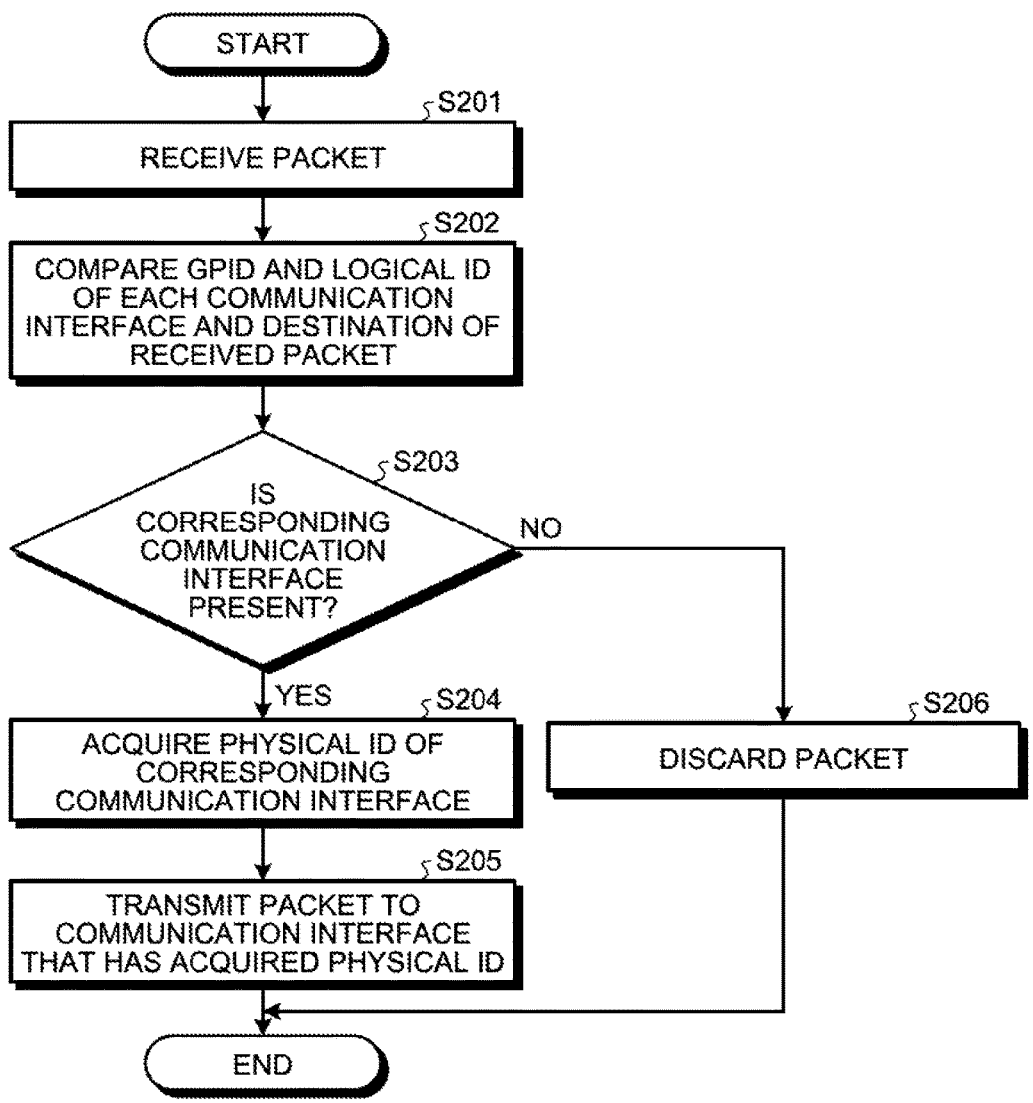
FIG. 6 is a flowchart of a process of allocating a received packet to a communication interface.

Next, a flow of allocating a received packet to the communication interface 113 will be described with reference to FIG. 6. FIG. 6 is a flowchart of a process of allocating a received packet to a communication interface.

The packet receiving unit 144 in the transmitting and receiving circuit 114 receives a packet from another node 10 via RDMA communication (step S201).

The packet receiving unit 144 acquires, from a header of a received packet, a GPID of a parallel computation task and a logical ID of the communication interface 113 that are a destination of the packet.

Then, the packet receiving unit 144 compares a GPID and a logical ID of a destination of a packet with a GPID and a logical ID of the communication interface 113 registered in the allocation table 401 that corresponds to the node 10 for a transmission source (step S202).

The packet receiving unit 144 determines whether or not the communication interface 113 with a destination of a packet being identical to a GPID and a logical ID is registered in the allocation table 401 (step S203).

In a case where the communication interface 113 with a destination of a packet being identical to a GPID and a logical ID is registered in the allocation table 401 (step S203: Yes), the packet receiving unit 144 acquires a corresponding physical ID of the communication interface 113 (step S204).

The packet receiving unit 144 transmits a packet to the communication interface 113 that has an acquired physical ID (step S205).

In a case where the communication interface 113 with a destination of a packet being identical to a GPID and a logical ID is not registered in the allocation table 401 (step S03: No), the packet receiving unit 144 discards a received packet (step S206).

In the above descriptions, a case has been described where a GPID is dynamically allocated to a parallel computation task and a logical ID is dynamically allocated to the communication interface 113 that is used in each process that belongs to the parallel computation task. However, a target for allocating a GPID thereto is not limited to a parallel computation task. For example, a GPID may be allocated to a process that executes particular communication or a process that executes communication with a predefined purpose, and a logical ID may be allocated to the communication interface 113 that is used in such a process. In such a case, a logical ID may be allocated fixedly. A process that executes particular communication is, for example, a particular computation process, a particular IO process, a process that executes communication for a system, or the like.

As described above, a parallel processing apparatus according to the present embodiment allocates a GPID as a global identifier for identifying each parallel computation task and each communication purpose, and allocates a logical identifier to each parallel computation task and a communication interface that is used in a communication purpose. A parallel processing apparatus according to the present embodiment executes communication between nodes by using a global identifier and a logical identifier.

Even in a case where a logical identifier that is allocated to a communication interface is used fixedly, another parallel computation task or communication for a communication purpose is not influenced thereby. Therefore, even in a case where a logical identifier fixedly allocated to a communication interface is used, degradation of throughput of a parallel processing apparatus can be reduced. That is, a degree of freedom of allocation of an identifier that is used for communication can be improved.

Although a logical identifier is dynamically allocated to a communication interface in communication for a parallel processing apparatus according to the present embodiment, preliminary exchange of identifiers between nodes is not executed, so that communication can be executed without using a communication means for identifier exchange and communication can be executed in an easy process.

Communication that uses a global identifier and a logical identifier in a parallel processing apparatus according to the present embodiment does not generate overhead that is caused by software processing in a case of virtualization of a communication interface that is executed by software. Hence, degradation of throughput of a parallel processing apparatus can be reduced.

At a time of introduction of a virtual machine, a global identifier that differs from a virtual machine to another is allocated, and thereby, competition can be resolved so that no hardware for avoiding competition between setting registers may be mounted. Therefore, competition between virtual machines can be resolved in a simple configuration.

A parallel processing apparatus according to the present embodiment can be applied to a distributed memory parallel computer for scientific computation. Utilization of a distributed memory parallel computer for scientific computation is expected in a process that uses a new application, such as large-scale graph processing, a machine learning, or neuromorphic computation in addition to a conventional numerical simulation. In such an application, communication delay is a bottleneck to cause a lot of waiting time, and hence, a plurality of parallel computation tasks are simultaneously executed in each node so that a rate of utilization of a processor can be improved and throughput of parallel computation task processing in a whole system can be improved. A parallel processing apparatus according to the present embodiment facilitates simultaneous execution of a plurality of parallel computation tasks in each node, and hence, can accelerate utilization of a new application in a distributed memory parallel computer for scientific computation.

According to an aspect of a parallel processing apparatus and a method for controlling communication as disclosed in the present application, an advantageous effect is provided in such a manner that throughput can be improved in a simple configuration.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A parallel processing apparatus comprising a plurality of information processing devices including a first information processing device, a second information processing device and a management device, wherein:
   the first information processing device includes a transmitting unit that transmits, to the second information processing device via RDMA communication, a packet with a first identifier which represents a predetermined process and a second identifier which represents one of a plurality of communication interfaces included in information processing devices other than the first information processing device and is a logical identifier, as destinations, being added thereto;
   the second information processing device includes a plurality of communication interfaces and a receiving unit that receives a packet transmitted from the first information processing device via RDMA communication, selects a communication interface which is a destination of a received packet and is used in the predetermined process, based on the first identifier and the second identifier added to the received packet, and transfers the received packet to the selected communication interface; and
   the management device includes a first allocation unit that allocates a unique global identifier which includes the first identifier to each of a plurality of processes which are executed by the second information processing device, and include, respectively, the predetermined processes which execute communication for different purpose.

2. The parallel processing apparatus according to claim 1, wherein:
   the predetermined process is each parallel computation task that includes one or more processes, and
   the second information processing device further includes a second allocation unit that allocates respectively different second identifiers to communication interfaces which are used in each of the processes among a plurality of the communication interfaces.

3. The parallel processing apparatus according to claim 1, wherein:
   the first information processing device further includes a first execution unit that executes the predetermined process;
   the second information processing device further includes a second execution unit that executes the predetermined process associatively with the first execution unit;
   the transmitting unit transmits a packet with the first identifier and the second identifier, as destinations, being added thereto, to the second information processing device via RDMA communication, in a case of packet transmission according to a predetermined process that is executed by the first execution unit; and
   the receiving unit includes a receiving unit that identifies the predetermined process which is executed by the second execution unit based on the first identifier added to a received packet, selects the communication interface which is used in the predetermined process and is a destination of a packet based on the second identifier, and transfers the received packet to a selected communication interface.

4. A method of controlling communication between a plurality of information processing devices including a first information processing device, a second information processing device and a management device, each of the plurality of information processing devices includes a plurality of communication interfaces, wherein:
   the first information processing device is caused to transmit, to the second information processing device via RDMA communication, a packet with a first identifier that represents a predetermined process and a second identifier that represents one of a plurality of communication interfaces included in information processing devices other than the first information processing device and is a logical identifier, as destinations, being added thereto;
   the second information processing device is caused to receive a packet transmitted from the first information processing device via RDMA communication, select a communication interface that is a destination of a received packet and is used in the predetermined process, based on the first identifier and the second identifier added to the received packet, and transfers the received packet to a selected communication interface; and
   the management device includes a first allocation unit that allocates a unique global identifier which includes the first identifier to each of a plurality of processes which are executed by the second information processing device, and include, respectively, the predetermined processes which execute communication for different purpose.

* * * * *